US012157466B2

United States Patent
Seta et al.

(10) Patent No.: US 12,157,466 B2
(45) Date of Patent: Dec. 3, 2024

(54) VEHICLE CONTROLLER, AND METHOD AND COMPUTER PROGRAM FOR CONTROLLING VEHICLE

(71) Applicant: TOYOTA JIDOSHA KABUSHIKI KAISHA, Toyota (JP)

(72) Inventors: Takahiro Seta, Yokohama (JP); Ryuta Hashimoto, Tokyo-to (JP); Kota Harada, Tokyo-to (JP); Soichi Yoshino, Ichikawa (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 189 days.

(21) Appl. No.: 18/157,927

(22) Filed: Jan. 23, 2023

(65) Prior Publication Data

US 2023/0294689 A1 Sep. 21, 2023

(30) Foreign Application Priority Data

Mar. 15, 2022 (JP) ................. 2022-040593

(51) Int. Cl.
*B60W 30/12* (2020.01)
*B60W 40/04* (2006.01)
*G06V 20/56* (2022.01)
*G06V 20/58* (2022.01)

(52) U.S. Cl.
CPC ............ *B60W 30/12* (2013.01); *B60W 40/04* (2013.01); *G06V 20/588* (2022.01); *B60W 2420/403* (2013.01); *B60W 2552/53* (2020.02); *B60W 2554/4041* (2020.02); *B60W 2554/4044* (2020.02); *B60W 2556/20* (2020.02); *B60W 2556/40* (2020.02); *B60W 2556/45* (2020.02)

(58) Field of Classification Search
CPC ................. B60W 30/12; B60W 40/04; B60W 2554/4041; B60W 2552/53; B60W 2556/40; B60W 2556/20; B60W 2556/45; B60W 2420/403; G06V 20/588
See application file for complete search history.

(56) References Cited

U.S. PATENT DOCUMENTS

2021/0387619 A1    12/2021  Yatagai et al.
2022/0221305 A1*   7/2022   Chikamori ......... G01C 21/3896

FOREIGN PATENT DOCUMENTS

| JP | 2014-133477 A | 7/2014 |
| JP | 2017-045356 A | 3/2017 |
| JP | 2019-117059 A | 7/2019 |
| JP | 2021-196690 A | 12/2021 |

* cited by examiner

*Primary Examiner* — Jacob M Amick
(74) *Attorney, Agent, or Firm* — Oliff PLC

(57) ABSTRACT

A vehicle controller includes a processor configured to detect a lane on which a vehicle is traveling, determine whether the position of the detected lane relative to an edge of a road being traveled by the vehicle may differ from an actual position, identify first control of the vehicle required to execute on the detected lane and second control of the vehicle required to execute on an adjoining lane adjoining the detected lane, omit to execute the first control when the position of the detected lane may differ from the actual position and the first control is prohibited on the adjoining lane, and execute the second control when the position of the detected lane may differ from the actual position and the second control exists.

13 Claims, 6 Drawing Sheets

VEHICLE CONTROLLER, AND METHOD AND COMPUTER PROGRAM FOR CONTROLLING VEHICLE

FIELD

The present invention relates to a vehicle controller, and a method and a computer program for controlling a vehicle.

BACKGROUND

In autonomous driving control of a vehicle, a vehicle controller executes a localization process for detecting a lane on which the vehicle is traveling, which may be referred to as a "travel lane" below, and executes vehicle control, including a lane change, as necessary, based on the result of the localization process. For appropriate autonomous driving control of a vehicle, a technique for accurately detecting a travel lane has been proposed (see Japanese Unexamined Patent Publication JP2017-45356A).

A vehicle controller disclosed in JP2017-45356A recognizes dividing lines demarcating a travel path, and estimates first parameters as travel path parameters for identifying the travel path, based on the recognized dividing lines. The vehicle controller further recognizes a leading vehicle ahead of a host vehicle, estimates the trajectory of the recognized leading vehicle, based on a record of the positions of the leading vehicle, and estimates second parameters as the travel path parameters, based on the estimated trajectory. In addition, the vehicle controller calculates first reliability levels of the estimated first parameters and second reliability levels of the estimated second parameters. For each of the travel path parameters, the vehicle controller further integrates the first and second parameters, depending on the first and second reliability levels, to calculate an integration parameter. The vehicle controller then estimates the travel path, based on the calculated integration parameters, and assists in driving the host vehicle, based on the integration parameters. The vehicle controller changes the degree of driving assistance, depending on integrated reliability levels.

SUMMARY

In some cases, a vehicle controller has difficulty in correctly detecting a travel lane even by the technique disclosed in JP2017-45356A. For example, when a lane-dividing line is blurred, it is difficult to correctly detect a travel lane. In such difficulty in detecting a travel lane, a problem such as omission of necessary control may arise.

It is an object of the present invention to provide a vehicle controller that can cause a vehicle to execute required control even if the result of detection of a travel lane is incorrect.

According to an embodiment, a vehicle controller is provided. The vehicle controller includes a processor configured to: compare a sensor signal representing surroundings of a vehicle with a map including information on lanes of a road being traveled by the vehicle to detect a lane being traveled by the vehicle among the lanes, the sensor signal being obtained by a sensor mounted on the vehicle, determine whether the position of the detected lane relative to an edge of the road may differ from an actual position, identify first control of the vehicle required to execute on the detected lane and second control of the vehicle required to execute on an adjoining lane adjoining the detected lane, based on the sensor signal or the map, omit to execute the first control when the position of the detected lane may differ from the actual position and the first control is prohibited on the adjoining lane, and execute the second control when the position of the detected lane may differ from the actual position and the second control exists.

The processor of the vehicle controller preferably determines that the position of the detected lane relative to the edge of the road being traveled by the vehicle may differ from the actual position, when construction information received from another device indicates that road construction is carried out during a predetermined period including the current time in a section from the current position of the vehicle to a predetermined distance away.

Alternatively, the processor preferably determines that the position of the detected lane relative to the edge of the road being traveled by the vehicle may differ from the actual position, when the date and time of the latest update of the map is a predetermined period or more earlier than the current time or when the map and a route-search-purpose map used by a navigation device for searching for a travel route of the vehicle differ in road structure in a section from the current position of the vehicle to a predetermined distance away.

Alternatively, the processor preferably determines that the position of the detected lane relative to the edge of the road being traveled by the vehicle may differ from the actual position, when a trajectory of another vehicle in a section from the current position of the vehicle to a predetermined distance away passes through an area in the map impassable to the vehicle.

Alternatively, the processor preferably determines that the position of the detected lane relative to the edge of the road being traveled by the vehicle may differ from the actual position, until a certain time elapses or the vehicle travels a certain distance from the start of detection of the lane being traveled by the vehicle.

Additionally, the processor preferably determines that the position of the detected lane relative to the edge of the road being traveled by the vehicle may differ from the actual position, when the number of lanes represented in the map or the sensor signal at the current position of the vehicle is not less than a predetermined number and the detected lane is located within a predetermined range of the center of lanes at the current position.

Additionally, the processor preferably determines that the position of the detected lane relative to the edge of the road being traveled by the vehicle may differ from the actual position, when the number of lanes at the current position differs from the number of lanes at the position of the vehicle a predetermined time ago by a predetermined number or more.

Additionally, the processor preferably determines that the position of the detected lane relative to the edge of the road being traveled by the vehicle may differ from the actual position, when the position of a predetermined feature detected from the sensor signal differs from the position of a corresponding feature in the map relative to the position of the detected lane.

Additionally, the processor preferably determines that the position of the detected lane relative to the edge of the road being traveled by the vehicle may differ from the actual position, when a confidence score of a predetermined feature detected from the sensor signal is not higher than a predetermined confidence score threshold.

Additionally, the processor preferably determines that the position of the detected lane relative to the edge of the road being traveled by the vehicle may differ from the actual position, when no vehicle traveling in an area relative to the position of the detected lane can be detected during a certain period. The area is represented by the sensor signal and corresponds to an area in the map passable by the vehicle.

Additionally, the processor preferably determines that the position of the detected lane relative to the edge of the road being traveled by the vehicle may differ from the actual position, when the current position of the vehicle is within a predetermined range of an error occurrence point predefined in the map.

According to another embodiment, a method for controlling a vehicle is provided. The method includes: comparing a sensor signal representing surroundings of the vehicle with a map including information on lanes of a road being traveled by the vehicle to detect a lane being traveled by the vehicle among the lanes, the sensor signal being obtained by a sensor mounted on the vehicle; determining whether the position of the detected lane relative to an edge of the road may differ from an actual position; identifying first control of the vehicle required to execute on the detected lane and second control of the vehicle required to execute on an adjoining lane adjoining the detected lane, based on the sensor signal or the map; omitting to execute the first control when the position of the detected lane may differ from the actual position and the first control is prohibited on the adjoining lane; and executing the second control when the position of the detected lane may differ from the actual position and the second control exists.

According to still another embodiment, a non-transitory recording medium that stores a computer program for controlling a vehicle is provided. The computer program includes instructions causing a processor mounted on a vehicle to execute a process including comparing a sensor signal representing surroundings of the vehicle with a map including information on lanes of a road being traveled by the vehicle to detect a lane being traveled by the vehicle among the lanes, the sensor signal being obtained by a sensor mounted on the vehicle; determining whether the position of the detected lane relative to an edge of the road may differ from an actual position; identifying first control of the vehicle required to execute on the detected lane and second control of the vehicle required to execute on an adjoining lane adjoining the detected lane, based on the sensor signal or the map; omitting to execute the first control when the position of the detected lane may differ from the actual position and the first control is prohibited on the adjoining lane; and executing the second control when the position of the detected lane may differ from the actual position and the second control exists.

The vehicle controller according to the present invention has an advantageous effect of enabling a vehicle to execute required control even if the result of detection of a travel lane is incorrect.

DESCRIPTION OF EMBODIMENTS

A vehicle controller, a method for vehicle control executed by the vehicle controller, and a computer program for vehicle control will now be described with reference to the attached drawings. The vehicle controller detects a lane on which a vehicle is traveling among lanes of a road being traveled by the vehicle, by comparing a sensor signal representing the surroundings of the vehicle and obtained by a sensor mounted on the vehicle with a map including information on the lanes. The vehicle controller then determines whether the position of the detected lane relative to an edge of the road being traveled by the vehicle may differ from an actual position. In addition, the vehicle controller identifies first control of the vehicle required to execute on the detected lane and second control of the vehicle required to execute on an adjoining lane adjoining the detected lane. The vehicle controller executes the first control only when it is determined that the detected lane does not differ from the actual position or when the first control is not prohibited on the adjoining lane. In other words, the vehicle controller omits to execute the first control when the position of the detected lane may differ from the actual position and the first control is prohibited on the adjoining lane. When the position of the detected lane may differ from the actual position and the second control exists, the vehicle controller executes the second control. In this way, the vehicle controller can execute control required of the vehicle or omit to execute control forbidden the vehicle even if the position of the detected lane is incorrect.

Figure 1A:
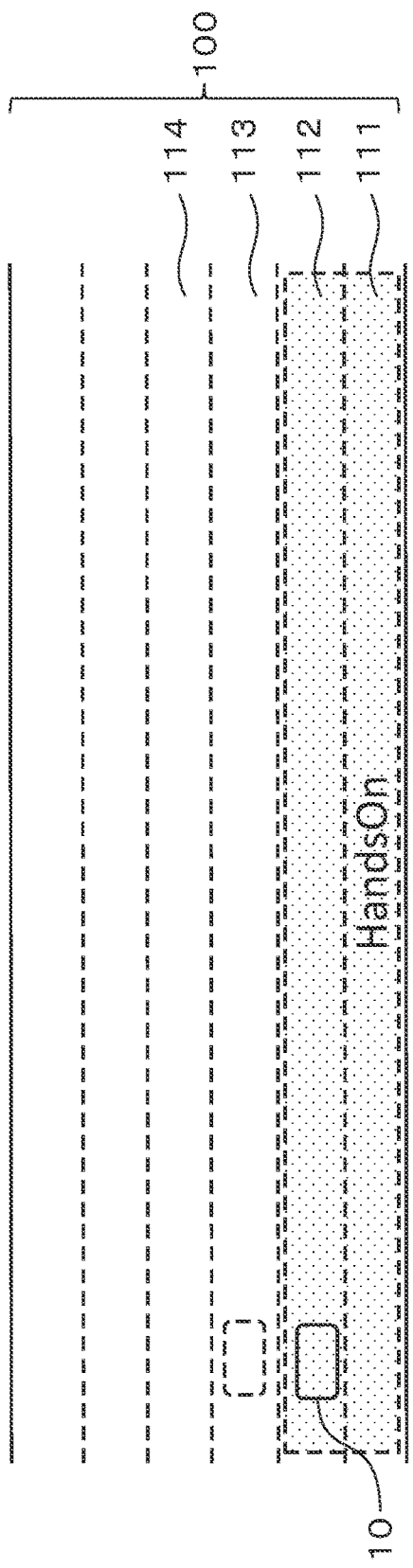
FIG. 1A illustrates an example of required or prohibited control depending on lanes.
Figure 1B:
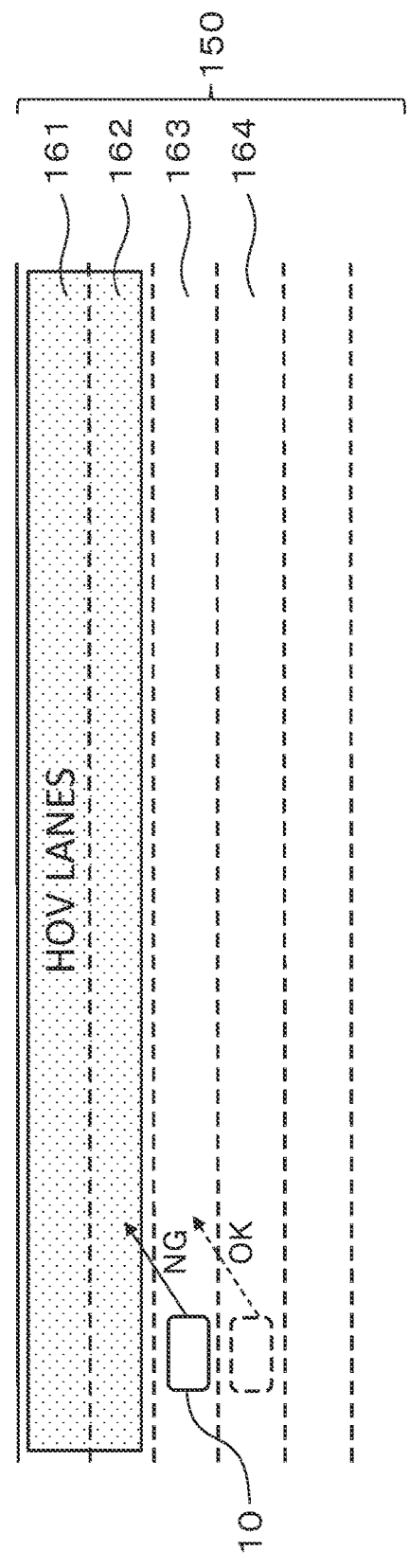
FIG. 1B illustrates another example of required or prohibited control depending on lanes.

FIGS. 1A and 1B illustrate examples of required or prohibited control depending on lanes. In the example illustrated in FIG. 1A, a vehicle 10 is traveling on a lane 112 of a road 100 having six lanes; the lane 112 is the second from the right with respect to the travel direction of the vehicle 10. On the rightmost lane 111 and the second lane 112 from the right in the road 100, drivers are requested to hold a steering wheel (a request for holding a steering wheel will be referred to as a "HandsOn request" below). However, assume that a lane 113 adjoining the lane 112 on the left is erroneously detected as a travel lane. If a driver is not notified of a HandsOn request as a result of the erroneous detection, the driver may not notice the request for holding the steering wheel and fail to do so.

Thus, in the present embodiment, when the lane 113 is detected as the travel lane, not only control required on the lane 113 but also control required on lanes 112 and 114 adjoining the lane 113 on the right and left, respectively, are identified. When control required on the adjoining lane 112 or 114 exists, this control is executed. More specifically, in this example, the driver is notified of a HandsOn request because holding a steering wheel is required on the adjoining lane 112.

In the example illustrated in FIG. 1B, a vehicle 10 is traveling on a lane 113 of a road 150 having six lanes; the lane 113 is the third from the left with respect to the travel direction of the vehicle 10. In the road 150, the leftmost lane 161 and the second lane 162 from the left are high-occupancy vehicle (HOV) lanes on which only vehicles with at least a predetermined number of occupants are allowed to travel. For this reason, if the number of occupants of the vehicle 10 is less than the predetermined number, the vehicle 10 is prohibited from entering the lanes 161 and 162. Thus, if the number of occupants of the vehicle 10 is less than the predetermined number, the vehicle 10 traveling on the lane 163 is prohibited from making a lane change to the left neighboring lane 162 on the left. However, assume that a lane 164 adjoining the lane 163 on the right is erroneously detected as a travel lane. If the vehicle 10 makes a lane change to the left neighboring lane as a result of the erroneous detection, the vehicle 10 will enter the lane 162, which is not allowed.

Thus, in the present embodiment, when the lane 164 is detected as the travel lane and the vehicle 10 is requested to make a lane change to the left neighboring lane, it is determined whether the lane change is prohibited on the lane 163 adjoining the lane 164 on the left. Since a lane change to the left neighboring lane 162 is prohibited on the lane 163, the lane change is not made. In this way, the vehicle 10 is prevented from erroneously entering the HOV lane even if the position of the detected lane differs from an actual position.

Figure 2:
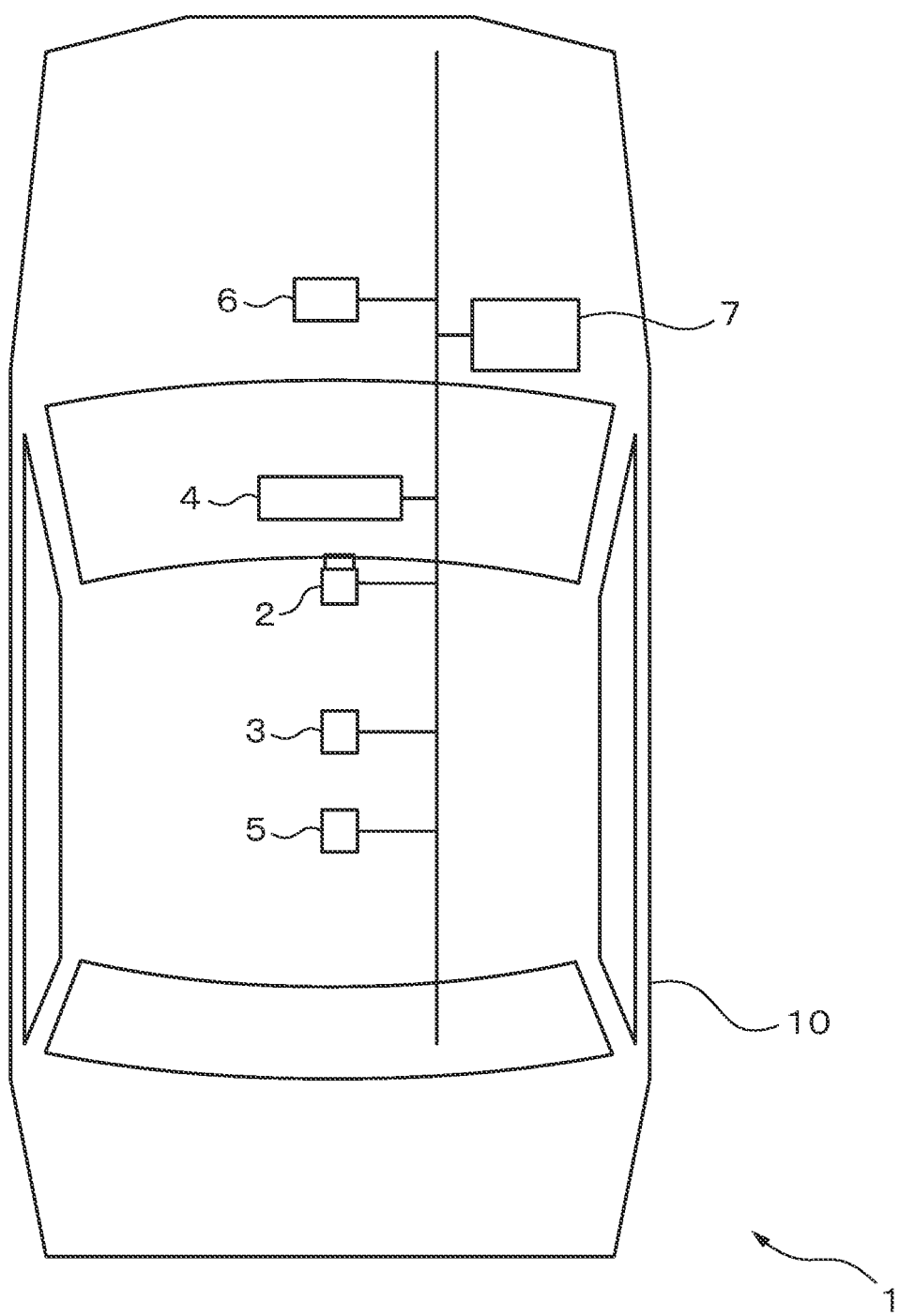
FIG. 2 schematically illustrates the configuration of a vehicle control system equipped with a vehicle controller.
Figure 3:
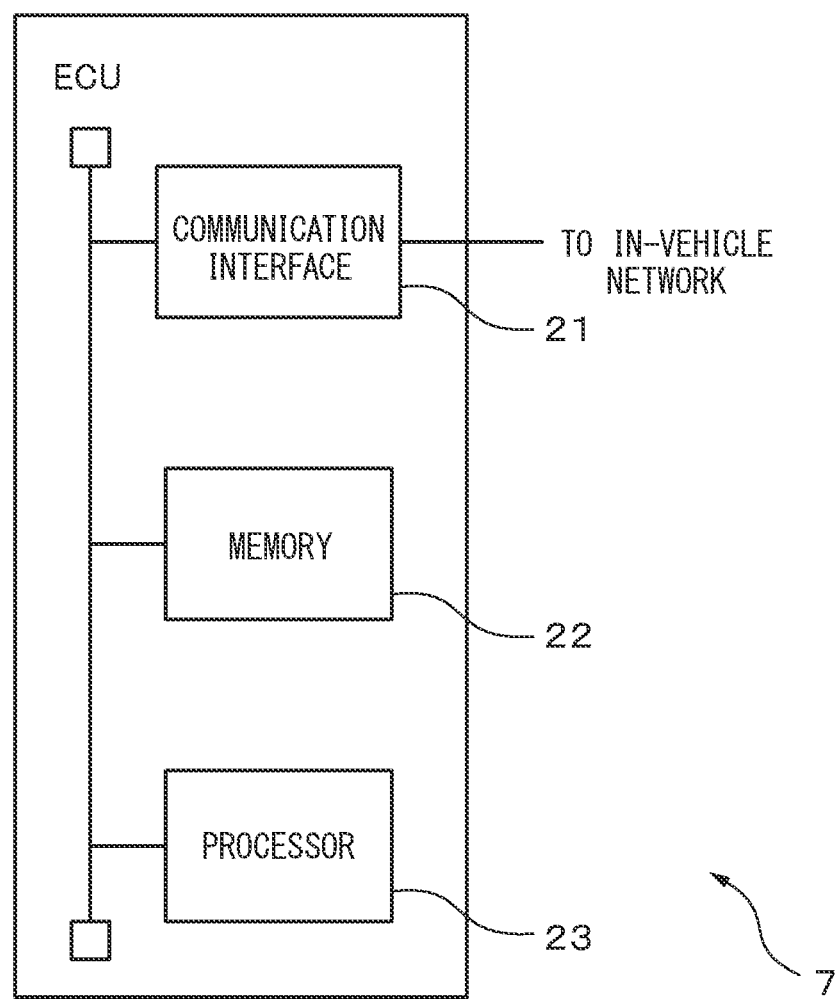
FIG. 3 illustrates the hardware configuration of an electronic control unit, which is an embodiment of the vehicle controller.

FIG. 2 schematically illustrates the configuration of a vehicle control system equipped with the vehicle controller. FIG. 3 illustrates the hardware configuration of an electronic control unit, which is an embodiment of the vehicle controller. In the present embodiment, the vehicle control system 1, which is mounted on a vehicle 10 and controls the vehicle 10, includes a camera 2, a GPS receiver 3, a navigation device 4, a wireless communication device 5, a storage device 6, and an electronic control unit (ECU) 7, which is an example of the vehicle controller. The camera 2, the GPS receiver 3, the navigation device 4, the wireless communication device 5, and the storage device 6 are communicably connected to the ECU 7 via an in-vehicle network conforming to a standard, such as a controller area network. The vehicle control system 1 may further include a distance sensor (not illustrated), such as LiDAR or radar, which measures the distances from the vehicle 10 to objects around the vehicle 10.

The camera 2, which is an example of a sensor that generates a sensor signal representing the surroundings of the vehicle 10, includes a two-dimensional detector constructed from an array of optoelectronic transducers, such as CCD or C-MOS, having sensitivity to visible light and a focusing optical system that forms an image of a target region on the two-dimensional detector. The camera 2 is mounted, for example, in the interior of the vehicle 10 so as to be oriented, for example, to the front of the vehicle 10. The camera 2 captures a region in front of the vehicle 10 every predetermined capturing period (e.g., ⅟30 to ⅟10 seconds), and generates images representing the region. Each image obtained by the camera 2 is an example of the sensor signal. The vehicle 10 may include multiple cameras taking pictures in different orientations or having different focal lengths.

Whenever an image is generated, the camera 2 outputs the generated image to the ECU 7 via the in-vehicle network.

The GPS receiver 3 receives GPS signals from GPS satellites at predetermined intervals, and determines the position of the vehicle 10, based on the received GPS signals. The GPS receiver 3 outputs positioning information indicating the result of determination of the position of the vehicle 10 based on the GPS signals to the navigation device 4 and the ECU 7 via the in-vehicle network at predetermined intervals. Instead of the GPS receiver, the vehicle 10 may include a receiver that receives positioning signals from satellites of another satellite positioning system to determine the position of the vehicle 10.

The navigation device 4 executes a navigation process on the vehicle 10 in accordance with a navigation program executed by the device. For example, when the driver starts the navigation program and inputs a destination of the vehicle 10, the navigation device 4 searches for a travel route of the vehicle 10 from the current position of the vehicle 10 to the destination. To this end, the navigation device 4 refers to a route-search-purpose map stored therein and representing individual road sections and the connection relationship therebetween (hereafter a "road map") to search for a travel route in accordance with a predetermined route searching technique, such as Dijkstra's algorithm. The travel route includes information indicating, for example, a road that the vehicle will travel before reaching the destination, a travel direction at a divergent point on the travel route, and the position of an intersection at which the vehicle will turn right or left. The navigation device 4 can use, for example, the position of the vehicle 10 based on the latest result of determination received from the GPS receiver 3 as the current position of the vehicle 10. Upon determining a travel route of the vehicle 10, the navigation device 4 outputs information indicating the travel route to the ECU 7 via the in-vehicle network.

The wireless communication device 5 communicates with a wireless base station by wireless in conformity with a predetermined standard of mobile communications. The wireless communication device 5 receives traffic information indicating the traffic situation or construction information indicating the state of construction of a road being traveled by the vehicle 10 or an area therearound (e.g., information provided by the Vehicle Information and Communication System) from another device via the wireless base station. The wireless communication device 5 then outputs the received traffic information to the ECU 7 via the in-vehicle network. The construction information includes, for example, information on the places and times of day at which road construction is carried out. The wireless communication device 5 may receive a high-precision map of a predetermined region around the current position of the vehicle 10 used for autonomous driving control from a map server via the wireless base station, and output the received high-precision map to the storage device 6.

The storage device 6 includes, for example, a hard disk drive, a nonvolatile semiconductor memory, or an optical medium and an access device therefor. The storage device 6 stores a high-precision map, which is an example of the map including information on lanes of a road. The high-precision map includes, for example, information indicating the number of lines, road markings such as lane-dividing lines or stop lines, and traffic signs for each road included in a predetermined region represented in the map. The high-precision map may further include, for each road, information indicating control required of vehicles traveling on lanes of the road and control forbidden vehicles traveling on lanes of the road, on a lane-by-lane basis.

The storage device 6 may further include a processor for executing, for example, a process to update the high-precision map and a process related to a request from the ECU 7 to read out the high-precision map. For example, whenever the vehicle 10 moves a predetermined distance, the storage device 6 may transmit the current position of the vehicle 10 and a request to obtain a high-precision map to the map server via the wireless communication device 5, and receive a high-precision map of a predetermined region around the current position of the vehicle 10 from the map server via the wireless communication device 5. When receiving a request from the ECU 7 to read out the high-precision map, the storage device 6 cuts out that portion of the high-precision map stored therein which includes the current position of the vehicle 10 and which represents a region smaller than the predetermined region, and outputs the cut portion to the ECU 7 via the in-vehicle network.

The ECU 7 executes autonomous driving control of the vehicle 10. In the present embodiment, the ECU 7 detects a lane on which the vehicle 10 is traveling by comparing an image obtained by the camera 2 with the high-precision map, and determines whether the position of the detected lane relative to an edge of a road being traveled by the vehicle 10 may differ from an actual position. The ECU 7 then determines control to be actually executed according to control required on the detected lane and control required on a lane adjoining the detected lane, and executes the determined control.

As illustrated in FIG. 3, the ECU 7 includes a communication interface 21, a memory 22, and a processor 23. The communication interface 21, the memory 22, and the processor 23 may be configured as separate circuits or a single integrated circuit.

The communication interface 21 includes an interface circuit for connecting the ECU 7 to the in-vehicle network. Whenever an image is received from the camera 2, the communication interface 21 passes the received image to the processor 23. Whenever positioning information is received from the GPS receiver 3, the communication interface 21 passes the positioning information to the processor 23. When a travel route is received from the navigation device 4, the communication interface 21 passes the travel route to the processor 23. When traffic information or other information is received via the wireless communication device 5 from another device, the communication interface 21 passes the received information to the processor 23. Further, the communication interface 21 passes the high-precision map read from the storage device 6 to the processor 23.

The memory 22 includes, for example, volatile and non-volatile semiconductor memories, and stores various types of data used in a vehicle control process executed by the processor 23. For example, the memory 22 stores parameters of the camera 2 including the focal length, the direction of image capturing, and the mounted position as well as various parameters for defining an object-detecting classifier used for detecting, for example, road features. The memory 22 further stores a reference table representing the relationship between the type of road marking or traffic sign and control corresponding thereto. Further, the memory 22 stores a travel route, positioning information of the vehicle 10, images of the surroundings of the vehicle 10, and a high-precision map. Further, the memory 22 temporarily stores various types of data generated during the vehicle control process.

The processor 23 includes one or more central processing units (CPUs) and a peripheral circuit thereof. The processor 23 may further include another operating circuit, such as a logic-arithmetic unit, an arithmetic unit, or a graphics processing unit. The processor 23 executes the vehicle control process on the vehicle 10 at predetermined intervals.

Figure 4:
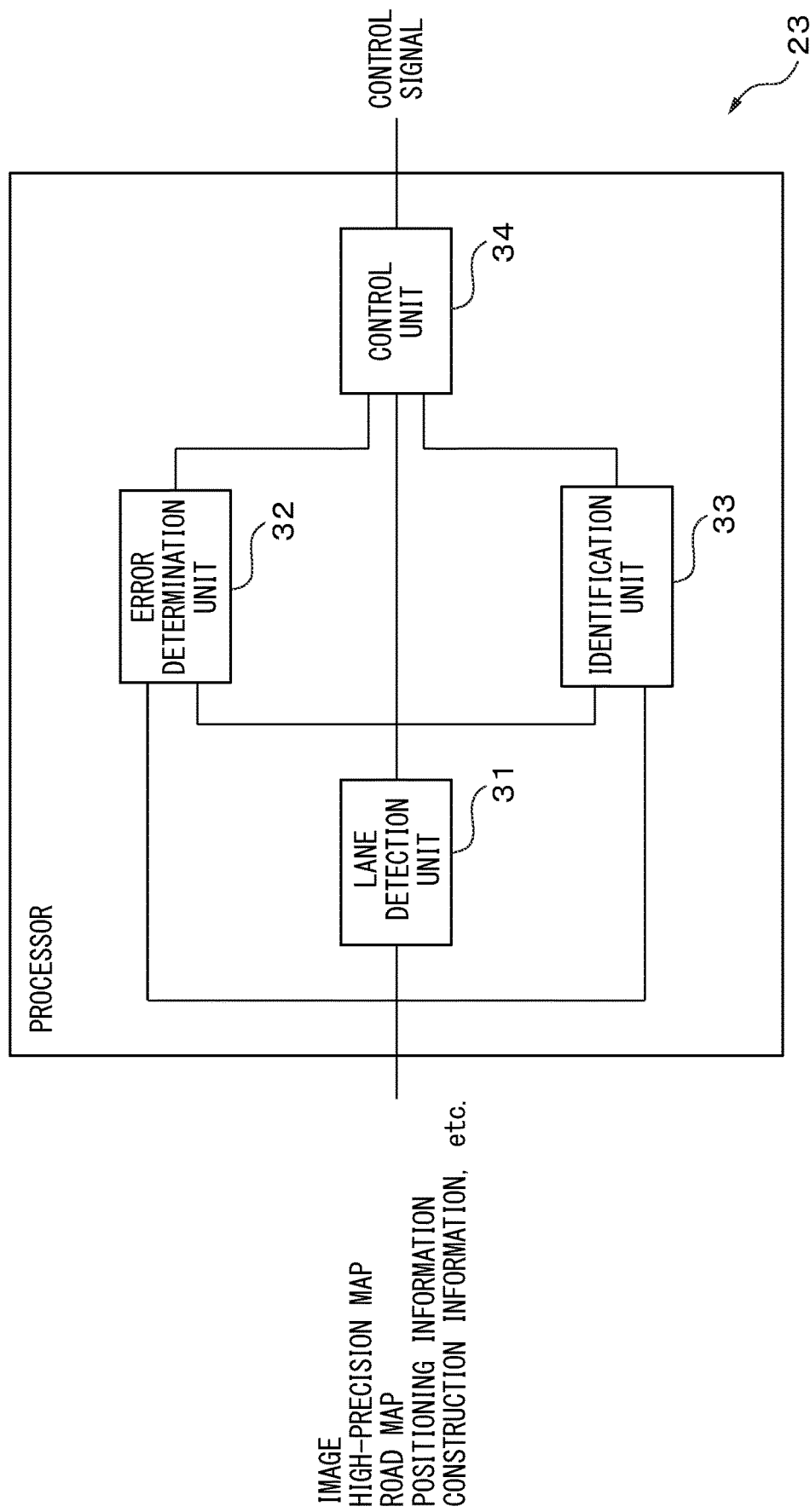
FIG. 4 is a functional block diagram of a processor of the electronic control unit, related to a vehicle control process.

FIG. 4 is a functional block diagram of the processor 23, related to the vehicle control process. The processor 23 includes a lane detection unit 31, an error determination unit 32, an identification unit 33, and a control unit 34. These units included in the processor 23 are, for example, functional modules implemented by a computer program executed by the processor 23, or may be dedicated operating circuits provided in the processor 23.

The lane detection unit 31, which is an example of the detection unit, detects a lane on which the vehicle 10 is traveling by comparing an image generated by the camera 2 and representing the surroundings of the vehicle 10 (hereafter simply an "image") with the high-precision map. For example, with an assumption about the position and orientation of the vehicle 10, the lane detection unit 31 projects features on or near the road detected from an image onto the high-precision map or features on or near the road around the vehicle 10 represented in the high-precision map onto the image. The features on or near the road may be, for example, road markings such as lane-dividing lines or stop lines, or curbstones. The lane detection unit 31 then estimates the position of the vehicle 10 to be the position and orientation of the vehicle 10 for the case where the features detected from the image match those represented in the high-precision map the best.

The lane detection unit 31 uses initial values of the assumed position and orientation of the vehicle 10 and parameters of the camera 2, such as the focal length, the height of the mounted position, and the direction of image capturing, to determine the positions in the high-precision map or the image to which the features are projected. As the initial values of the position and orientation of the vehicle 10 is used the position of the vehicle 10 measured by the GPS receiver 3 or obtained by correcting, with odometry information, the position and orientation of the vehicle 10 estimated at the last lane detection. The lane detection unit 31 then calculates the degree of matching between the features on or near the road detected from the image and the corresponding features represented in the high-precision map (e.g., the inverse of the sum of squares of the distances between the corresponding features).

The lane detection unit 31 repeats the above-described process while varying the assumed position and orientation of the vehicle 10. The lane detection unit 31 estimates the actual position of the vehicle 10 to be the position and orientation for the case where the degree of matching is a maximum. The lane detection unit 31 then refers to the high-precision map to identify the lane including the position of the vehicle 10 as the lane on which the vehicle 10 is traveling.

For example, the lane detection unit 31 may input an image into a classifier that has been trained to detect detection target features from an image, thereby detecting these features. As such a classifier, the lane detection unit 31 can use, for example, a deep neural network (DNN) having architecture of a convolutional neural network (CNN) type, such as Single Shot MultiBox Detector or Faster R-CNN. Alternatively, as such a classifier, the lane detection unit 31 may use a DNN having architecture of a self-attention network (SAN) type, e.g., a Vision Transformer. The classifier may output confidence scores indicating the degrees of reliability of the respective detected features. The classifier detects a region in the image having a confidence score calculated for a predetermined feature higher than a predetermined detection threshold as an object region representing the predetermined feature.

The lane detection unit 31 notifies information indicating the detected lane to the error determination unit 32, the identification unit 33, and the control unit 34.

The error determination unit 32 determines whether the position of the lane detected by the lane detection unit 31 relative to an edge of the road being traveled by the vehicle 10 may differ from an actual position.

Figure 5A:
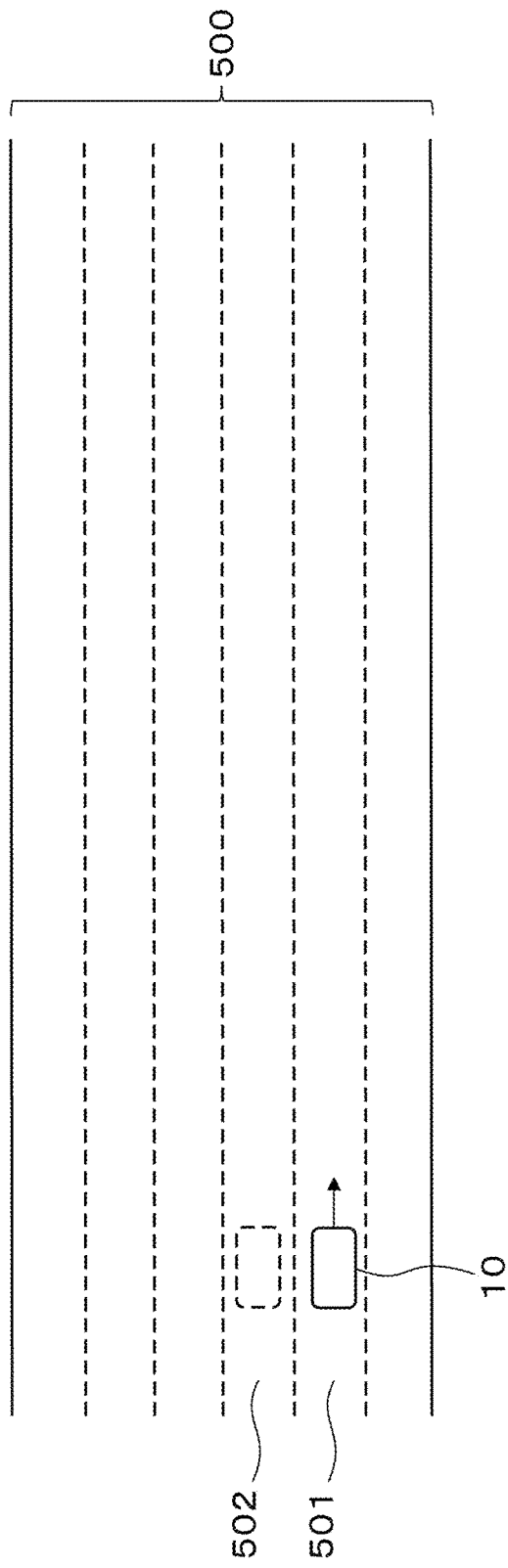
FIG. 5A illustrates an example in which the position of a detected lane relative to an edge of a road differs from an actual position.
Figure 5B:
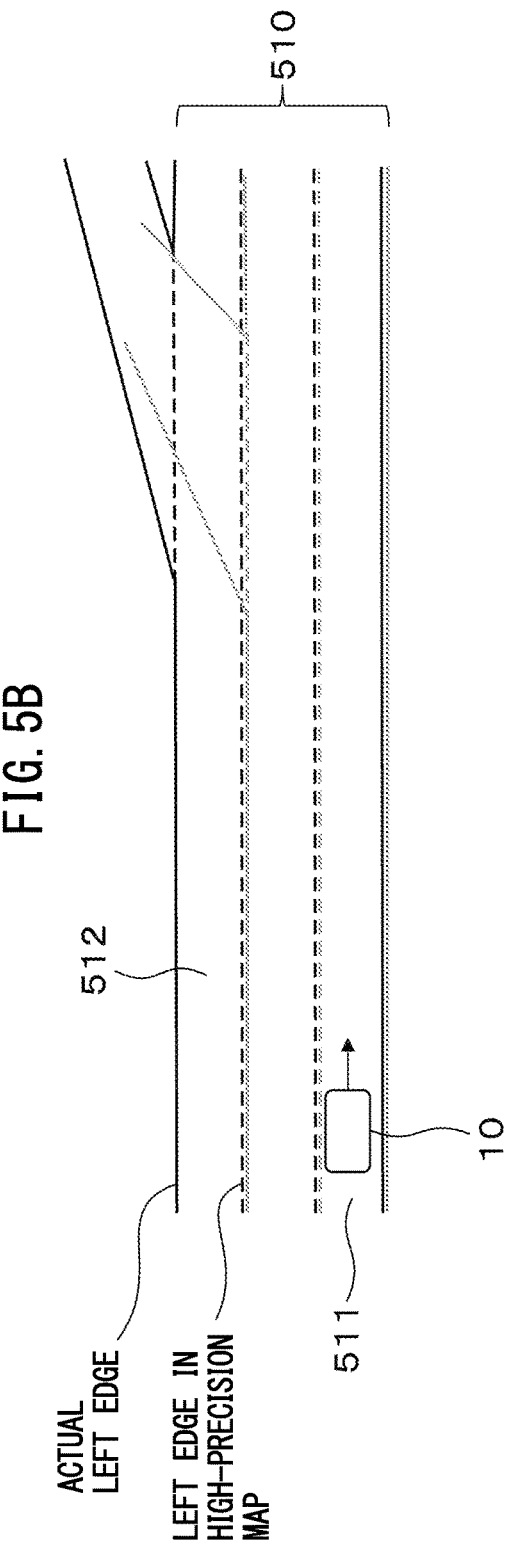
FIG. 5B illustrates another example in which the position of a detected lane relative to an edge of a road differs from an actual position.

FIGS. 5A and 5B illustrate examples in which the position of a detected travel lane differs from its actual position. In the example illustrated in FIG. 5A, of lanes of a road 500, the vehicle 10 is traveling on the second lane 501 from the right with respect to the travel direction of the vehicle 10. However, a lane 502 adjoining the lane 501 is erroneously detected as a travel lane. Thus the position of the detected lane differs from the actual position of the travel lane. Such erroneous detection of the lane may occur, for example, when the road being traveled by the vehicle 10 has many lanes or when it is difficult to distinguish a feature on the road, such as a lane-dividing line, because it is blurred. Erroneous detection of the lane may also occur when only a relatively short time has elapsed since the start of detection of the lane, e.g., when the vehicle 10 has just entered the area covered by the high-precision map.

In the example illustrated in FIG. 5B, of lanes of a road 510, the vehicle 10 is traveling on the rightmost lane 511 with respect to the travel direction of the vehicle 10. In this example, the lane 511 is detected as a travel lane. However, the leftmost lane 512 of the road 510 has been added after the generation of the high-precision map used by the vehicle 10 for detecting the lane, and thus the road 510 in the high-precision map does not include the lane 512. As a result, the number of lanes recognized by the lane detection unit 31 between the travel lane 511 and the left edge of the road 510 differs from the actual number of lanes between the travel lane 511 and the actual left edge of the road 510. Thus the position of the detected lane relative to the left edge of the road 510 differs from the actual position. Such a discrepancy between the numbers of lanes on the left and right of the detected lane in the high-precision map and the actual environment may occur, for example, when the high-precision map is not updated with the latest road information or when construction is carried out on the road.

Thus the error determination unit 32 determines whether the position of the detected lane relative to an edge of the road being traveled by the vehicle 10 may differ from the actual position, based on, for example, the structure of the road being traveled by the vehicle 10, circumstances of travel, and timing of generation or update of the high-precision map. More specifically, the error determination unit 32 determines whether the position of the detected lane may differ from the actual position, based on any of the determination processes described below. Execution of the determination processes enables the error determination unit 32 to correctly determine whether the position of the detected lane relative to an edge of the road being traveled by the vehicle 10 may differ from the actual position. The error determination unit 32 need not execute all of the determination processes described below, but executes at least one of them. In the following, the fact that the position of the detected lane relative to an edge of the road being traveled by the vehicle 10 differs from the actual position may be simply referred to as "the position of the detected lane differs from the actual position."

For example, the error determination unit 32 refers to construction information received from another device via the wireless communication device 5. When the construction information indicates that road construction is carried out during a predetermined period including the current time in a section from the current position of the vehicle 10 to a predetermined distance away, the error determination unit 32 determines that the position of the detected lane may differ from the actual position. This is because the road construction has changed the number of passable lanes and thereby the position of the detected lane may differ from the actual position.

Additionally, when the date and time of the latest update of the high-precision map is a predetermined period or more earlier than the current time, the error determination unit 32 determines that the position of the detected lane may differ from the actual position. Alternatively, when the high-precision map and the road map differ in road structure in a section from the current position of the vehicle 10 to a predetermined distance away, the error determination unit 32 may determine that the position of the detected lane may differ from the actual position. This is because the high-precision map does not correctly represent the road structure around the current position of the vehicle 10 and thereby the position of the detected lane may be mistaken.

Additionally, when a trajectory of another vehicle traveling ahead of the vehicle 10 in a section from the current position of the vehicle 10 to a predetermined distance away passes through an area in the high-precision map impassable to vehicles, the error determination unit 32 may determine that the position of the detected lane may differ from the actual position. This is because the leading vehicle cannot be actually traveling through the impassable area and thus the position of the detected lane is probably mistaken.

In this case, the error determination unit 32 detects traveling vehicles around the vehicle 10 from time-series images obtained by the camera 2. To this end, the error determination unit 32 inputs the time-series images into a classifier that has been trained to detect a detection target object from an image, thereby detecting vehicles around the vehicle 10 from each of the time-series images. As such a classifier, the error determination unit 32 can use, for example, a DNN having architecture of a CNN or SAN type, similarly to the classifier used by the lane detection unit 31.

The error determination unit 32 tracks the vehicles detected from the time-series images to determine the trajectories of these vehicles. To this end, the error determination unit 32 applies a tracking process based on optical flow, such as the Lucas-Kanade method, to an object region representing a vehicle of interest in the latest image obtained by the camera 2 and object regions in past images, thereby tracking the vehicle represented in the object regions. To achieve this, the error determination unit 32 applies, for example, a filter for extracting characteristic points, such as SIFT or Harris operator, to the object region of interest, thereby extracting characteristic points from the object region. The error determination unit 32 then identifies those points in the object regions in the past images which correspond to the characteristic points in accordance with the applied tracking technique, thereby calculating the optical flow. Alternatively, the error determination unit 32 may apply another tracking technique applied for tracking a moving object detected from an image to the object region of interest in the latest image and the object regions in the past images, thereby tracking the vehicle represented in the object regions.

For each vehicle being tracked, the error determination unit 32 executes viewpoint transformation, using information such as the position at which the camera 2 is mounted on the vehicle 10, thereby transforming the image coordinates of the tracked vehicle into coordinates in an aerial image ("aerial-image coordinates"). To this end, the error determination unit 32 can estimate the position of the detected vehicle at the time of acquisition of each image, using the position and orientation of the vehicle 10, an estimated distance to the detected vehicle, and the direction from the vehicle 10 to the detected vehicle at the time of acquisition of each image. The error determination unit 32 may obtain the position and orientation of the vehicle 10 from the lane detection unit 31. The error determination unit 32 can identify the direction from the vehicle 10 to the detected vehicle, based on the position of the object region including the detected vehicle in the image and the direction of the optical axis of the camera 2. Additionally, the estimated distance from the vehicle 10 to the detected vehicle is determined on the basis of the real-space size of the detected vehicle and the ratio of the size of the region of the vehicle in the image to a reference size of the vehicle in the image for the case where the distance to the vehicle is equal to a reference distance. The reference distance as well as the reference size in the image and the real-space size of the detected vehicle may be prestored, for example, in the memory 22. Additionally, the bottom position of an object region is supposed to correspond to the position at which the vehicle represented in the object region is in contact with the road surface. Thus the error determination unit 32 may estimate the distance to the vehicle represented in the object region, based on the direction from the camera 2 corresponding to the bottom of the object region and the height of the mounted position of the camera 2.

The error determination unit 32 superposes the trajectories of the vehicles determined as described above onto the high-precision map to determine whether these trajectories pass through the area impassable to vehicles. When the trajectory determined for one of the vehicles at least partially lies on the area impassable to vehicles, the error determination unit 32 determines that the position of the detected lane may differ from the actual position.

Additionally, the error determination unit 32 may determine that the position of the detected lane may differ from the actual position, until a certain time elapses or the vehicle 10 travels a certain distance from the start of detection of the lane. This is because the accuracy of detection of the lane may be insufficient immediately after the start of the process of detecting the lane.

Additionally, the error determination unit 32 determines whether the number of lanes represented in the high-precision map or an image generated by the camera 2 at the current position of the vehicle 10 is not less than a predetermined number. The predetermined number is set at, for example, any number not less than three, e.g., three to five. When the number of lanes is not less than the predetermined number and the detected lane is located within a predetermined range of the center of lanes at the current position of the vehicle 10, the error determination unit 32 determines that the position of the detected lane may differ from the actual position. This is because the position of the detected lane tends to be incorrect when the vehicle 10 is traveling near the center of a road having many lanes.

Additionally, when the number of lanes at the current position of the vehicle 10 differs from the number of lanes at the position of the vehicle 10 a predetermined time ago by a predetermined number or more, the error determination unit 32 determines that the position of the detected lane may differ from the actual position. This is because the position of the detected lane tends to be incorrect at a location where the number of lanes of the road being traveled by the vehicle 10 greatly changes.

Additionally, when the position of a predetermined feature detected from an image generated by the camera 2 differs from the position of a corresponding feature in the high-precision map relative to the position of the detected lane, the error determination unit 32 determines that the position of the detected lane may differ from the actual position. This is because such a discrepancy between the positions of a feature in the image and a corresponding feature in the high-precision map is supposed to result from incorrectness of the estimated position of the vehicle 10, which may cause the estimated position of the travel lane to be mistaken. The error determination unit 32 may project features detected from the image onto the high-precision map by a technique similar to estimation of the position of the host vehicle described in relation to the lane detection unit 31, and compare the positions of the features in the image with those of corresponding features in the high-precision map.

Additionally, when a confidence score of a predetermined feature detected from an image generated by the camera 2 is not higher than a predetermined confidence score threshold, the error determination unit 32 determines that the position of the detected lane may differ from the actual position. In this case, the confidence score may be one outputted by the classifier used by the lane detection unit 31. The predetermined confidence score threshold is preferably set higher than the detection threshold used by the lane detection unit 31 for detecting features from an image. This is because the accuracy of detection of features around the vehicle 10 is insufficient and thereby the estimated position of the travel lane may be mistaken.

Additionally, the error determination unit 32 detects another vehicle traveling in that area represented in an image generated by the camera 2 relative to the position of the detected lane which corresponds to an area in the high-precision map passable by the vehicle 10. When such another vehicle cannot be detected during a certain period, the error determination unit 32 determines that the position of the detected lane may differ from the actual position. It is supposed that other vehicles are traveling through an area in the high-precision map passable by the vehicle 10. Thus, when no vehicle is detected in the area in the image corresponding to the passable area, estimation of the position of the vehicle 10 may be mistaken, which may cause the position of the travel lane to be mistaken. The error determination unit 32 may project the area in the high-precision map passable by the vehicle 10 onto the image by a technique similar to estimation of the position of the host vehicle described in relation to the lane detection unit 31, and determine the area in the image corresponding to the passable area.

Additionally, the high-precision map may include information indicating a location at which detection of the lane is likely to fail (hereafter an "error occurrence point"). In this case, when the current position of the vehicle 10 is within a predetermined range of an error occurrence point predefined in the high-precision map, the error determination unit 32 determines that the position of the detected lane may differ from the actual position.

The error determination unit 32 notifies the control unit 34 of the result of determination whether the position of the detected lane may differ from the actual position.

The identification unit 33 identifies control of the vehicle 10 required to execute on the detected lane (hereafter "first control"), based on the current position of the vehicle 10 or an image generated by the camera 2. The identification unit 33 further identifies control of the vehicle 10 required to execute on an adjoining lane adjoining the detected lane (hereafter "second control"). For example, the first and second control includes at least one of the following: maintaining vehicle speed according to speed regulations, stopping a lane change to a lane where entry is prohibited, keeping the lane on which the vehicle is traveling, a lane change to a designated lane, holding a steering wheel and a HandsOn request to do so, and manual driving and a request for switching to manual driving.

The identification unit 33 refers to information indicating control set for the detected lane, which is included in the high-precision map, to identify control indicated by the information as the first control. Similarly, the identification unit 33 refers to information indicating control set for the adjoining lane, which is included in the high-precision map, to identify control indicated by the information as the second control. The second control may be set separately for the adjoining lanes on the left and right of the travel lane. The identification unit 33 may further identify control regulated on the adjoining lane by referring to information on vehicle control on another lane adjoining the adjoining lane, which is included in the high-precision map. For example, when another lane adjoining the adjoining lane is a lane where entry of the vehicle 10 is prohibited, such as an HOV lane, the identification unit 33 identifies a lane change to the lane adjoining the adjoining lane as the control regulated on the adjoining lane.

Alternatively, the identification unit 33 may detect a road marking or a traffic sign indicating control on the detected lane or the adjoining lane from an image generated by the camera 2 to identify the first or second control. In this case, the identification unit 33 inputs the image into a classifier that has been trained to detect a road marking or a traffic sign, thereby detecting a road marking or a traffic sign. As such a classifier, the identification unit 33 can use a classifier similar to that described in relation to feature detection by the lane detection unit 31. Thus the classifier outputs identifying information indicating the type of the detected road marking or traffic sign and information indicating an object region including the road marking or the traffic sign. Alternatively, features detected by the classifier used by the lane detection unit 31 may include a road marking or a traffic sign. In this case, the identification unit 33 receives identifying information of the detected road marking or traffic sign and information indicating an object region including the detected road marking or traffic sign in the image from the lane detection unit 31.

The identification unit 33 determines whether the detected road marking or traffic sign indicates first or second control, based on the positional relationship between the position of the object region including the detected road marking or traffic sign in the image and the lane-dividing lines in the image. To achieve this, the identification unit 33 identifies the areas representing the travel lane and the adjoining lane in the image by projecting the travel lane and the adjoining lane in the high-precision map onto the image by a technique similar to estimation of the position of the host vehicle described in relation to the lane detection unit 31. When the object region including the detected road marking is included in the area representing the travel lane or overlaps with the area to a degree not less than a predetermined threshold, the identification unit 33 determines that the road marking is formed on the travel lane. The identification unit 33 then identifies the control corresponding to the road marking formed on the travel lane by referring to the reference table representing the relationship between the type of road marking and control corresponding to the road marking, and determines the identified control as the first control. Similarly, when the object region including the detected road marking is included in the area representing the adjoining lane or overlaps with the area to a degree not less than the predetermined threshold, the identification unit 33 determines that the road marking is formed on the adjoining lane. The identification unit 33 then identifies the control corresponding to the road marking formed on the adjoining lane by referring to the reference table representing the relationship between the type of road marking and control corresponding to the road marking, and determines the identified control as the second control. In addition, of the signs for individual lanes represented in the detected traffic sign, the identification unit 33 identifies a sign at the same relative position as the detected lane among the lanes of the road being traveled by the vehicle 10, as a sign for the travel lane. For example, when the detected lane is the second from the right, the identification unit 33 identifies the second sign from the right among the individual signs represented in the detected traffic sign as a sign for the travel lane. Similarly, of the signs for individual lanes represented in the detected traffic sign, the identification unit 33 identifies a sign at the same relative position as the adjoining lane among the lanes of the road being traveled by the vehicle 10, as a sign for the adjoining lane. The identification unit 33 identifies the control corresponding to the traffic sign provided for the travel lane or the adjoining lane by referring to the reference table representing the relationship between the type of traffic sign and control corresponding to the traffic sign, similarly to identification of the first and second control based on a road marking. The identification unit 33 then determines the identified control as the first or second control.

In addition, the identification unit 33 may identify the first control required on the travel lane, based on the situation around the vehicle 10 represented in images. For example, the identification unit 33 detects a vehicle traveling in an area around the vehicle 10 from time-series images by a technique similar to that described in relation to the error determination unit 32, and tracks the detected vehicle. The identification unit 33 may then identify a lane change to an adjoining lane as the first control in the case where the vehicle being tracked is traveling ahead of the vehicle 10 on the travel lane and where the distance between the tracked vehicle and the vehicle 10 decreases with the passage of time and falls below a predetermined distance threshold at a certain time.

The identification unit 33 notifies the control unit 34 of the identified first and second control and the control regulated on the adjoining lane. When first control, second control, or control regulated on the adjoining lane is not detected at the current position of the vehicle 10, the identification unit 33 notifies, of these, the undetected control to the control unit 34.

The control unit 34 executes the first control only when it is determined that the detected lane does not differ from the actual position or when the first control is not prohibited on the adjoining lane. In other words, when the position of the detected lane may differ from the actual position and the first control is prohibited on a lane adjoining the detected lane, the control unit 34 omits to execute the first control. When the position of the detected lane may differ from the actual position and the second control exists, the control unit 34 executes the second control.

When notified by the error determination unit 32 that the position of the detected lane may differ from the actual position, the control unit 34 refers to the first control, the second control, and the control regulated on the adjoining lane that are notified by the identification unit 33. When the first control contradicts the second control required on the adjoining lane or is the control regulated on the adjoining lane, the control unit 34 omits to execute the first control.

More specifically, in the case where the first control is a lane change and where the second control on the adjoining lane is to keep the lane or a lane change to another lane adjoining the adjoining lane is restricted, the control unit 34 omits to make a lane change to the adjoining lane and keeps travel on the travel lane. When the first control does not contradict the second control required on the adjoining lane and differs from the control regulated on the adjoining lane, the control unit 34 executes the first control even if the position of the detected lane may differ from the actual position. Additionally, when it is determined that the position of the detected lane does not differ from the actual position, the control unit 34 also executes the first control. When the control unit 34 omits to execute the identified first control despite the existence thereof, the control unit 34 may notify the driver of what the first control is and the fact that the first control is omitted, with a notification device (not illustrated) provided in the interior of the vehicle 10. The notification device may be, for example, a display, a speaker, or a vibrator.

In addition, when notified by the error determination unit 32 that the position of the detected lane may differ from the actual position, the control unit 34 determines whether the second control notified by the identification unit 33 exists. When the second control notified by the identification unit 33 exists, the control unit 34 executes the second control. For example, when the second control is for the driver to hold the steering wheel, the control unit 34 notifies the driver of a HandsOn request with the notification device (not illustrated) provided in the interior of the vehicle 10. When the second control is to maintain vehicle speed according to speed regulations, the control unit 34 identifies the regulation speed on the road being traveled by the vehicle 10 by referring to the high-precision map, and controls the vehicle 10 to keep the speed of the vehicle 10 not greater than the identified regulation speed. More specifically, the control unit 34 sets the degree of accelerator opening so that the speed of the vehicle 10 is not greater than the regulation speed. The control unit 34 then determines the amount of fuel injection according to the set degree of accelerator opening, and outputs a control signal depending on the amount of fuel injection to a fuel injector of an engine of the vehicle 10. Alternatively, the control unit 34 determines electric energy to be supplied to a motor, according to the set degree of accelerator opening, and controls a driving circuit of the motor so that the determined electric energy will be supplied to the motor.

Figure 6:
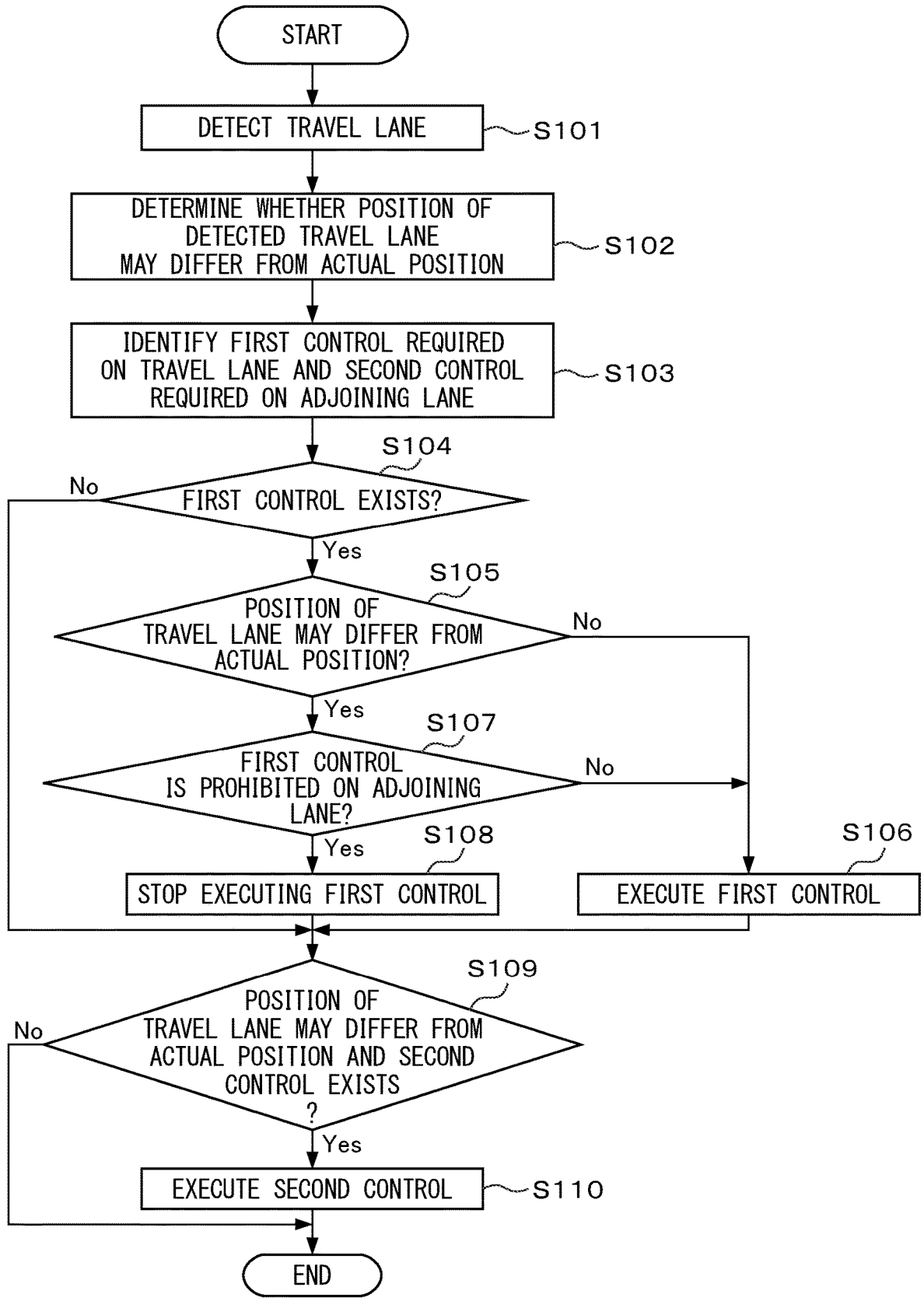
FIG. 6 is an operation flowchart of the vehicle control process.

FIG. 6 is an operation flowchart of the vehicle control process executed by the processor 23. The processor 23 executes the vehicle control process in accordance with the operation flowchart described below at predetermined intervals.

The lane detection unit 31 of the processor 23 detects a lane on which the vehicle 10 is traveling (step S101). Additionally, the error determination unit 32 of the processor 23 determines whether the position of the detected lane relative to an edge of a road being traveled by the vehicle 10 may differ from an actual position (step S102).

In addition, the identification unit 33 of the processor 23 identifies first control required to execute on the travel lane and second control required to execute on an adjoining lane (step S103).

The control unit 34 of the processor 23 determines whether the identified first control exists (step S104). When the identified first control exists (Yes in step S104), the control unit 34 determines whether the result of determination notified by the error determination unit 32 indicates that the position of the detected lane may differ from the actual position (step S105). When the result of determination indicates that the position of the detected lane does not differ from the actual position (No in step S105), the control unit 34 executes the identified first control (step S106).

When the result of determination indicates that the position of the detected lane may differ from the actual position (Yes in step S105), the control unit 34 determines whether the first control is prohibited on the adjoining lane (step S107). When the first control is not prohibited on the adjoining lane (No in step S107), the control unit 34 executes the identified first control (step S106). When the first control is prohibited on the adjoining lane (Yes in step S107), the control unit 34 stops executing the first control (step S108).

After step S106 or S108 or when the identified first control does not exist in step S104 (No in step S104), the control unit 34 refers to the result of determination notified by the error determination unit 32 and the identified second control. The control unit 34 then determines whether the result of determination indicates that the position of the detected lane may differ from the actual position and the identified second control exists (step S109). When the result of determination indicates that the position of the detected lane may differ from the actual position and the identified second control exists (Yes in step S109), the control unit 34 executes the second control (step S110). The processor 23 then terminates the vehicle control process. When the result of determination indicates that the position of the detected lane does not differ from the actual position or when the identified second control does not exist (No in step S109), the processor 23 also terminates the vehicle control process.

As has been described above, the vehicle controller determines whether the position of the detected lane relative to an edge of a road being traveled by the vehicle may differ from an actual position. In addition, the vehicle controller identifies first control of the vehicle required to execute on the detected lane and second control of the vehicle required to execute on an adjoining lane adjoining the detected lane. The vehicle controller executes the first control only when it is determined that the detected lane does not differ from the actual position or when the first control is not prohibited on the adjoining lane. In other words, the vehicle controller omits to execute the first control when the position of the detected lane may differ from the actual position and the first control is prohibited on the adjoining lane. When the position of the detected lane may differ from the actual position and the second control exists, the vehicle controller executes the second control. In this way, the vehicle controller can execute control required of the vehicle or omit to execute control forbidden the vehicle even if the position of the detected lane is incorrect.

The computer program for achieving the functions of the processor 23 of the ECU 7 according to the embodiment or modified examples may be provided in a form recorded on a computer-readable and portable medium, such as a semiconductor memory, a magnetic medium, or an optical medium.

As described above, those skilled in the art may make various modifications according to embodiments within the scope of the present invention.

What is claimed is:

1. A vehicle controller comprising:
a processor configured to:
compare a sensor signal representing surroundings of a vehicle with a map including information on lanes of a road being traveled by the vehicle to detect a lane being traveled by the vehicle among the lanes, the sensor signal being obtained by a sensor mounted on the vehicle, determine whether the position of the detected lane relative to an edge of the road may differ from an actual position, identify first control of the vehicle required to execute on the detected lane and second control of the vehicle required to execute on an adjoining lane adjoining the detected lane, based on the sensor signal or the map, omit to execute the first control when the position of the detected lane may differ from the actual position and the first control is prohibited on the adjoining lane, and execute the second control when the position of the detected lane may differ from the actual position and the second control exists.

2. The vehicle controller according to claim 1, wherein the processor determines that the position of the detected lane relative to the edge of the road may differ from the actual position, when construction information received from another device indicates that road construction is carried out during a predetermined period including the current time in a section from the current position of the vehicle to a predetermined distance away.

3. The vehicle controller according to claim 1, wherein the processor determines that the position of the detected lane relative to the edge of the road may differ from the actual position, when the date and time of the latest update of the map is a predetermined period or more earlier than the current time or when the map and a route-search-purpose map used by a navigation device for searching for a travel route of the vehicle differ in road structure in a section from the current position of the vehicle to a predetermined distance away.

4. The vehicle controller according to claim 1, wherein the processor determines that the position of the detected lane relative to the edge of the road may differ from the actual position, when a trajectory of another vehicle in a section from the current position of the vehicle to a predetermined distance away passes through an area in the map impassable to the vehicle.

5. The vehicle controller according to claim 1, wherein the processor determines that the position of the detected lane relative to the edge of the road may differ from the actual position, until a certain time elapses or the vehicle travels a certain distance from the start of detection of the lane being traveled by the vehicle.

6. The vehicle controller according to claim 1, wherein the processor determines that the position of the detected lane relative to the edge of the road may differ from the actual position, when the number of lanes represented in the map or the sensor signal at the current position of the vehicle is not less than a predetermined number and the detected lane is located within a predetermined range of the center of lanes of the road at the current position of the vehicle.

7. The vehicle controller according to claim 1, wherein the processor determines that the position of the detected lane relative to the edge of the road may differ from the actual position, when the number of lanes at the current position differs from the number of lanes at the position of the vehicle a predetermined time ago by a predetermined number or more.

8. The vehicle controller according to claim 1, wherein the processor determines that the position of the detected lane relative to the edge of the road may differ from the actual position, when the position of a predetermined feature detected from the sensor signal differs from the position of a corresponding feature in the map relative to the position of the detected lane.

9. The vehicle controller according to claim 1, wherein the processor determines that the position of the detected lane relative to the edge of the road may differ from the actual position, when a confidence score of a predetermined feature detected from the sensor signal is not higher than a predetermined confidence score threshold.

10. The vehicle controller according to claim 1, wherein the processor determines that the position of the detected lane relative to the edge of the road may differ from the actual position, when no vehicle traveling in an area relative to the position of the detected lane can be detected during a certain period, the area being represented by the sensor signal and corresponding to an area in the map passable by the vehicle.

11. The vehicle controller according to claim 1, wherein the processor determines that the position of the detected lane relative to the edge of the road may differ from the actual position, when the current position of the vehicle is within a predetermined range of an error occurrence point predefined in the map.

12. A method for controlling a vehicle, comprising:

comparing a sensor signal representing surroundings of the vehicle with a map including information on lanes of a road being traveled by the vehicle to detect a lane being traveled by the vehicle among the lanes, the sensor signal being obtained by a sensor mounted on the vehicle;

determining whether the position of the detected lane relative to an edge of the road may differ from an actual position;

identifying first control of the vehicle required to execute on the detected lane and second control of the vehicle required to execute on an adjoining lane adjoining the detected lane, based on the sensor signal or the map;

omitting to execute the first control when the position of the detected lane may differ from the actual position and the first control is prohibited on the adjoining lane; and executing the second control when the position of the detected lane may differ from the actual position and the second control exists.

13. A non-transitory recording medium that stores a computer program for controlling a vehicle, the computer program causing a processor mounted on a vehicle to execute a process comprising:

comparing a sensor signal representing surroundings of the vehicle with a map including information on lanes of a road being traveled by the vehicle to detect a lane being traveled by the vehicle among the lanes, the sensor signal being obtained by a sensor mounted on the vehicle;

determining whether the position of the detected lane relative to an edge of the road may differ from an actual position;

identifying first control of the vehicle required to execute on the detected lane and second control of the vehicle required to execute on an adjoining lane adjoining the detected lane, based on the sensor signal or the map;

omitting to execute the first control when the position of the detected lane may differ from the actual position and the first control is prohibited on the adjoining lane; and executing the second control when the position of the detected lane may differ from the actual position and the second control exists.

\* \* \* \* \*